Nov. 9, 1971 V. M. BRASLAVSKY 3,618,460
DEVICE FOR MACHINING SURFACES OF ARTICLES
WITH ROTATING CUTTING TOOL
Filed March 26, 1969
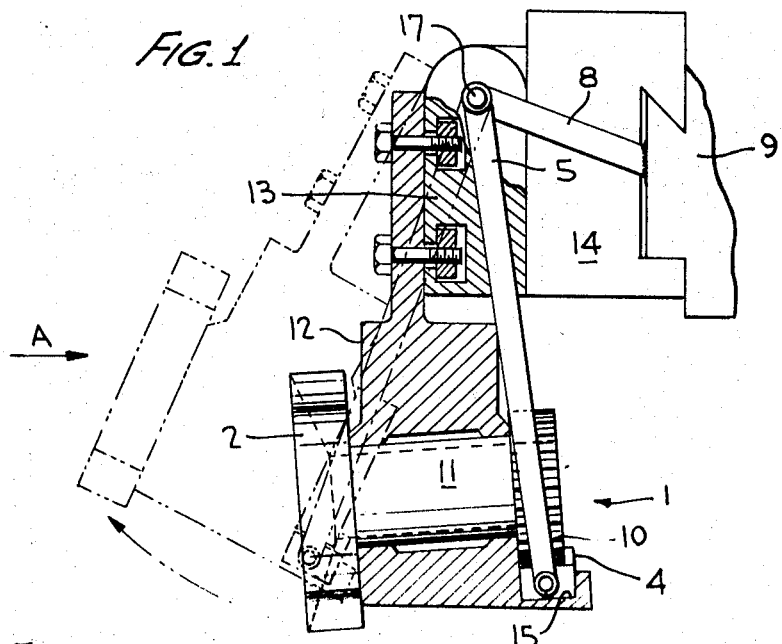
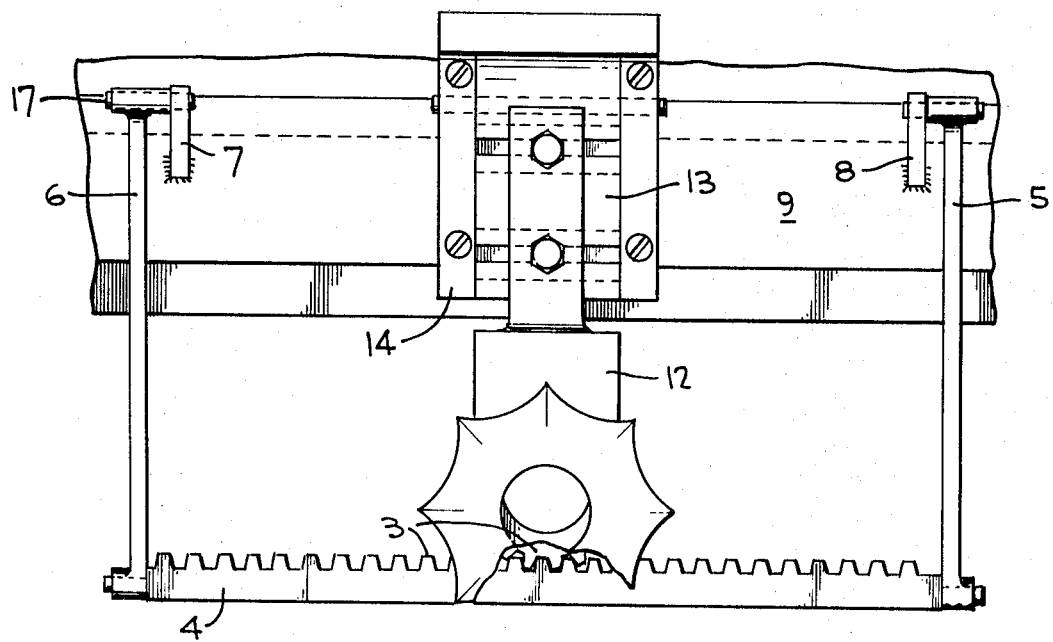
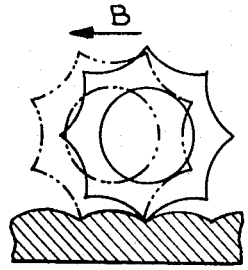
INVENTOR,
VENIAMIN MARKOVICH BRASLAVSKY
BY Holman & Stern
ATTORNEYS 3,618,460
Patented Nov. 9, 1971

3,618,460
DEVICE FOR MACHINING SURFACES OF ARTICLES WITH ROTATING CUTTING TOOL
Veniamin Markovich Braslavsky, Ulitsa Michurina 40, kv. 14, Sverdlovsk, U.S.S.R.
Filed Mar. 26, 1969, Ser. No. 810,730
Int. Cl. B23d 13/02
U.S. Cl. 90—54           3 Claims

ABSTRACT OF THE DISCLOSURE

In a planer for cutting curvilinear profiles with a rotating cutter incorporating a mechanism for coordinating the angular motion of the cutter with its translational movement in the direction of feed. The device can be utilized for machining the surfaces of a curvilinear profile on machine tools.

BACKGROUND OF THE INVENTION

The present invention relates to a device for machining the surfaces of articles and more specifically to a device for machining the surfaces of articles with a rotating cutter for utilization with machine tools mainly planing machines. This device is particularly efficient in machining a curvilinear profile.

Known in the art are devices provided with a rotating cutter for machining different parts of a surface of articles in which the tool lip come in to contact with the surface being machined and these parts are successively changed as the cutter is turned by the cutting forces. However, these devices cannot be used for machining curvilinear surfaces.

SUMMARY OF THE INVENTION

An object of the present invention is to eliminate the aforesaid disadvantage.

The main object of the invention is to provide a device for machining the surfaces of articles, particularly curvilinear surfaces with a rotating cutter, on machine tools, mainly planing machines.

This object is achieved by providing a device for machining the surface of articles with a rotating cutter on machine tool, mainly planers, which comprises a mechanism for coordinating the angular motion of the cutter with its translational movement in the direction of feed.

The mechanism for coordinating the angular motion of the cutter with its translational movement in the direction of feed may include a rack-and-gear transmission in which the rack is stationary in the direction of feed, and the gear meshing therewith is rigidly connected to an arbor designed for holding the cutter tool.

The device constructed in compliance with this invention ensures accurate machining of the surfaces of articles, particularly those having a curvilinear profile on general purpose machines, mainly planers.

Additional objects and advantages of the invention will become more readily apparent to persons skilled in the art from the following detailed description and annexed drawings and in which drawings:

BRIEF DESCRIPTION OF THE DRAWINGS

FIG. 1 is a vertical partial section of a device for machining the surface of a device for machining the surface of articles on a planing machine with a rotating cutter according to the invention;

FIG. 2 is a a view looking in the direction of arrow A in FIG. 1; and

FIG. 3 is a diagrammatic view showing the relative positions of the cutter and the surface being machined.

DETAILED DESCRIPTION OF THE INVENTION

The planer for machining the surfaces of a curvilinear profile comprises a mechanism 1 (FIG. 1) for coordinating the angular motion of a cutter 2 with its translational movement in the direction of the feed as denoted by arrow B (FIG. 3).

The mechanism 1 comprises a rack-and-gear transmission 3 in which a rack 4 is hinged on across an arm 9 by means of levers 5 and 6 and brackets 7 and 8. A gear 10 which is in mesh with the rack 4 is rigidly connected to an arbor 11 on which the cutter 2 is installed. The arbor 11 is mounted for rotary movement in a body 12 rigidly fastened on a tool clamp 13 of a hinged planer carriage 14. The body 12 is provided with a slot 15 through which the rack 4 is capable of movement.

The planing machine operates as follows:

A workpiece 16 (FIG. 3) is secured on the table of the planing machine (omitted in the drawing). In the course of planing, after each double stroke of the machine table, the carriage 14 together with the cutter 2 moves on the arm 9 in the direction of the arrow B through the distance of the feed.

In this case, the gear 10 rolls over the rack 4 and turns the arbor 11 together with the cutter 2 fastened thereto. Thus, each position of the cutter 2 moving in the direction of the feed corresponds to a certain angular position of the cutter. Due to the slot 15 in the body 12 through which the rack 4 passes, the rack is continuously in mesh with the gear 10.

At each idle stroke of the machine table, a tool retracting mechanism (omitted in the drawing so as not to obscure the main idea of the invention) turns the tool clamp 13 and the body 12 around a pivot 17, thereby resulting in the retraction of the cutter 2 from the surface being machined.

The turning of the tool clamp 13 is accompanied by the turning of the rack 4 around the pivot 17. The levers 5 and 6 do not prevent the rack 4 from turning around the pivot 17 but fix its position rigidly in the direction of the feed.

The shape of the cutter 2 is selected so as to produce the profile of the machined surface in the shape of the envelope of all the successive positions of the cutter as the cutter 2 turns and moves in the direction of the feed (FIG. 3).

The operation of the invention is as follows: looking at FIGS. 1 and 2, and keeping in mind that these figures show a side elevation and a front elevation of the inventive device respectively, it will be seen that cutter 2 which is attached to an arbor 11 is rotatably mounted in a body 12. On the other end of arbor 11 is fixed gear 10, which meshes with the rack 4. The body 12 is connected to the tool clamp 13, which in turn is pivotably connected to planer carriage 14. The planer carriage 14 is connected to the arm of the planing machine 9, in a dovetail fashion, so that the planer carriage moves in and out of the paper in FIG. 1, and parallel to the plane of the paper in FIG. 2. The planer carriage 14, because of the dove-tailing, along with elements 13, 12, 11 and 2, is thereby mounted on the planing machine.

Rack 4 is mounted to the arm of the planing machine 9 by way of rigid brackets 7 and 8, which carry pivots 17. Levers 5 and 6 have one end mounted on the pivots 17, and to the other end is mounted the rack 4.

When planing, the workpiece 16 is secured to a table (not shown) and this workpiece reciprocates in and out of the plane of the paper in FIG. 3. Because during cutting there is no relative movement between the rack and the gear 10, the angular rotation of cutter 2 is fixed.

When it is desired to change the depth of the cut by rotating cutter 2, and this is usually done after each work-stroke, the planer carriage 14 and hence clamp 13, body 12, and gear 10, are moved relative to the rack 4, which obviously rotates cutter 2. This amount of movement is a predetermined amount so that the depth of cut by the cutter 2 can be determined. Thereby, as the planer, or indeed any other machine tool that this inventive device is mounted on, traverses across the workpiece, the contour of the workpiece surface can be controlled.

The cutter 2 has a working stroke and an idle stroke, and the indexing of the cutter 2 is usually accomplished after each working stroke. On each idle stroke, the gear 4 by way of levers 5 and 6 can be rotated away from the workpiece, which because of the construction as clearly seen in FIGS. 1 and 2, will rotate body 12 and tool clamp 13 about planer carriage 14 on pivot 17. This means that the cutter 2 will not be dragged across the workpiece on the idle stroke.

What I claim is:

1. An attachment for cutting curvilinear profiles on workpieces with a rotary cutter when mounted on a planing machine and comprising the cutter having a cutting portion complementary to at least a portion of said curvilinear profiles and being rigidly connected to a shaft which is rotatably mounted in a body; a planer carriage adapted to be moveably mounted on the planing machine; a tool clamp mounted on said planer carriage and to which said body is mounted; a rack extending in the direction of movement of said planer carriage and attached to the planing machine; and a gear on said shaft, which gear meshes with said rack, whereby the machining is accomplished by moving the attachment relative to the workpiece while the cutter is fixed in a predetermined angular setting by said gear meshing with said rack and said gear is then moved relative to said rack to change the angular setting of said cutter and thereby determine the contour of the curvilinear profile.

2. The attachment as claimed in claim 1 wherein said tool clamp is pivotably mounted on said planar carriage and said rack is pivotably mounted on the planing machine such that the axes of the pivotal movement of said tool clamp and rack are co-axial, and when said rack is pivoted away from the workpiece, it carries with it the cutter, the body and the tool clamp.

3. The attachment as claimed in claim 4 wherein said body has a slot running in the direction of movement of said planar carriage and said rack is positioned in said slot so as to enable relative movement between said rack and said body which rotatably contains said gear.

References Cited

UNITED STATES PATENTS

| | | | |
|---|---|---|---|
| 945,958 | 1/1910 | Kleinfelder | 90—34 |
| 1,636,670 | 7/1927 | Shaw et al. | 90—34 X |

GIL WEIDENFELD, Primary Examiner

U.S. Cl. X.R.

90—52